(12) United States Patent
Nomura et al.

(10) Patent No.: US 8,997,561 B2
(45) Date of Patent: Apr. 7, 2015

(54) TIRE PRESSURE DECREASE DETECTION APPARATUS, METHOD, AND COMPUTER READABLE MEDIUM THEREFOR

(71) Applicant: Sumitomo Rubber Industries, Ltd., Kobe-shi, Hyogo (JP)

(72) Inventors: Atsushi Nomura, Kobe (JP); Seigou Sakagami, Kobe (JP); Hiroaki Kawasaki, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 13/936,427

(22) Filed: Jul. 8, 2013

(65) Prior Publication Data

US 2014/0130590 A1 May 15, 2014

(30) Foreign Application Priority Data

Nov. 9, 2012 (JP) .................................. 2012-246974

(51) Int. Cl.
*B60C 23/02* (2006.01)
*G01M 17/02* (2006.01)
*B60C 23/06* (2006.01)

(52) U.S. Cl.
CPC ............. *G01M 17/02* (2013.01); *B60C 23/061* (2013.01); *B60C 23/062* (2013.01)

(58) Field of Classification Search
CPC .......................................... B60C 23/00–23/20
USPC ................................................ 73/146–146.8
See application file for complete search history.

(56) References Cited

U.S. PATENT DOCUMENTS

| 5,553,491 A * | 9/1996 | Naito et al. ................... 73/146.5 |
| 6,142,026 A * | 11/2000 | Ohashi et al. ................ 73/865.9 |
| 7,963,157 B2 | 6/2011 | Kawasaki et al. |
| 8,726,724 B2 * | 5/2014 | Oshiro et al. .................... 73/146 |
| 2005/0150284 A1 * | 7/2005 | Hernando et al. ........... 73/146.4 |

(Continued)

FOREIGN PATENT DOCUMENTS

| EP | 0925960 A2 | 6/1999 |
| JP | 6-286429 A | 10/1994 |

(Continued)

OTHER PUBLICATIONS

Extended European Search Report for European Application No. 13177563.7, dated Oct. 24, 2013.

*Primary Examiner* — Andre Allen
(74) *Attorney, Agent, or Firm* — Birch, Stewart, Kolasch & Birch, LLP

(57) ABSTRACT

An apparatus for detecting a decrease in tire pressure based on a resonance frequency of a tire installed in a vehicle includes rotation information detection means for detecting rotation information of the tire, resonance frequency estimate means for estimating the resonance frequency of the tire from the rotation information of the tire, and judgment means for judging the decrease in the tire pressure by comparison between the resonance frequency estimated by the resonance frequency estimate means and a reference frequency preliminarily determined by learning at the time of initialization. An effective speed region when the reference frequency is determined at the time of the initialization is a first speed or less. The apparatus further includes effective speed region change means for extending an upper limit of the effective speed region to a second speed which is larger than the first speed at the time of shifting.

9 Claims, 2 Drawing Sheets

1: WHEEL SPEED DETECTION MEANS
2: CONTROL UNIT
3: DISPLAY
4: INITIALIZATION BUTTON
5: ALARM

(56) References Cited

U.S. PATENT DOCUMENTS

| | | | |
|---|---|---|---|
| 2006/0142912 A1* | 6/2006 | Oshiro | 701/29 |
| 2010/0013616 A1* | 1/2010 | Fujita et al. | 340/443 |
| 2010/0013617 A1* | 1/2010 | Fujita et al. | 340/443 |
| 2010/0164704 A1* | 7/2010 | Lindskog et al. | 340/442 |
| 2010/0217542 A1* | 8/2010 | Fujita et al. | 702/50 |
| 2010/0225463 A1* | 9/2010 | Fujita et al. | 340/443 |
| 2011/0107828 A1* | 5/2011 | Kawasaki | 73/146.2 |

FOREIGN PATENT DOCUMENTS

| | | |
|---|---|---|
| JP | 6-344734 A | 12/1994 |
| JP | 9-323515 A | 12/1997 |
| JP | 2009-274639 A | 11/2009 |

* cited by examiner

1: WHEEL SPEED DETECTION MEANS
2: CONTROL UNIT
3: DISPLAY
4: INITIALIZATION BUTTON
5: ALARM

TIRE PRESSURE DECREASE DETECTION APPARATUS, METHOD, AND COMPUTER READABLE MEDIUM THEREFOR

TECHNICAL FIELD

The present invention relates to a tire pressure decrease detection apparatus, method and computer readable medium therefor. Further in detail, the present invention relates to a tire pressure decrease detection apparatus, method and computer readable medium therefor for detecting a decrease in pressure of a tire based on a resonance frequency of the tire of a traveling vehicle.

BACKGROUND ART

One of factors for letting an automobile safely travel includes pressure of a tire. When the pressure is decreased to less than a proper value, operating stability and fuel consumption are deteriorated, so that a tire burst may sometimes be caused. Therefore, a tire pressure monitoring system (TPMS) for detecting a decrease in tire pressure and issuing an alarm so as to urge a driver to take a proper action is an important technique from a view of protecting an environment and ensuring safety of the driver.

The conventional monitoring system can be classified into two types including a direct detection type and an indirect detection type. The direct detection type is to directly measure the pressure of the tire by incorporating pressure sensors inside a tire wheel. Although the decrease in the pressure can be detected with high precision, some disadvantages in terms of technique and cost remain including a need for a dedicated wheel and a problem in fault tolerance in an actual environment.

Meanwhile, the indirect detection type is a method for estimating the pressure from rotation information of the tire, and can further be classified into a DLR (Dynamic Loaded Radius) method and a RFM (Resonance Frequency Mechanism) method. The DLR method is a method for utilizing a phenomenon that a dynamic loaded radius is decreased due to crush of a deflated tire during traveling and as a result the tire is rotated more quickly than a tire of normal pressure, and comparing rotation speed of four tires so as to detect the decrease in the pressure. Since calculation processing is relatively easily performed with using only rotation speed signals of wheels obtained from wheel speed sensors, the DLR method has been widely studied for a purpose of mainly detecting a puncture of one wheel. However, it is anything more than relative comparison between the rotation speed of the wheels. Thus, a case where the four wheels are deflated at the same time (natural leakage) cannot be detected. Since a wheel speed difference is also generated by traveling conditions such as turning of the vehicle, acceleration/deceleration, and a biased load, there is a problem that deflation cannot be precisely detected through all the traveling states.

On the other hand, the RFM method is a method for utilizing a change in a frequency characteristic of wheel speed signals due to deflation so as to detect a difference from normal pressure. Unlike the DLR method, due to absolute comparison with preliminarily held normal values of wheels, the RFM method can respond to deflation of four wheels at the same time and is drawing attention as a better indirect detection method. The present invention relates to a tire state detection apparatus based on the RFM method. Hereinafter, the basic principle of this method will be described in detail.

When a vehicle travels, torsional motion in the front and rear direction emerging upon a tire receiving a force from a road surface and front-rear motion of suspension cause coupled resonance. This resonance phenomenon exerts an influence over rotation motion of a wheel. Thus, information on the resonance phenomenon is also included in a wheel speed signal acquired from a wheel sensor which is installed in an anti-lock braking system (ABS). Further, the coupled resonance is an inherent vibrating mode due to torsional rigidity of the tire. Thus, an excitation state thereof is changed depending only on a change in pressure constituting a physical characteristic of the tire, hardly depending on changes in vehicle speed and the road surface. That is, when the pressure is lowered, dynamics of the torsional motion of the tire are changed. Thus, when the wheel speed signal is frequency-analyzed, a peak made by the coupled resonance (hereinafter, referred to as the "resonance peak") emerges on the lower frequency side at the time of deflation than the time of normal pressure. This phenomenon emerges independently from a type of the tire or the vehicle, traveling speed, a situation of the road surface, and the like due to the above-mentioned characteristic. Thus, the RFM method focuses on a resonance frequency, and issues an alarm in a case where the resonance frequency is relatively lower than a reference frequency estimated at the time of initialization. There is a need for estimating the resonance frequency from the wheel speed signal obtained from the ABS or the like which is installed in the vehicle. Regarding estimate of such a resonance frequency, various methods have been conventionally proposed (for example, refer to Patent Literature 1).

In the RFM method, in order to retain the resonance frequency with normal pressure of the tire, in a case where the tire pressure is adjusted or the tire is replaced, there is a need for procedure of initializing a monitoring system and after that storing a resonance frequency obtained by traveling for a fixed time as a reference frequency (leaning step). After learning is completed, the processing is automatically shifted to judgment by comparing the stored reference frequency and the current resonance frequency.

CITATION LIST

Patent Literature

Patent Literature 1: Japanese Unexamined Patent Publication No. 2009-274639

SUMMARY OF INVENTION

Technical Problem

In the conventional monitoring system of the RFM method, since an S/N ratio of the wheel speed signal becomes less advantageous with higher vehicle speed, variations of an estimate value of the resonance frequency are increased, and as a result, judgment precision of the decrease in the pressure is lowered. Thus, maximum speed with which the monitoring system effectively operates is set to, for example, 100 km/h.

However, since an upper limit of legal speed is 80 mph (about 128 km/h) in the North American market for example, the current monitoring system cannot sufficiently work and is required to effectively operate up to a higher speed region.

An upper limit value of an effective speed region of the monitoring system can be changed by re-writing a variable in a tire pressure decrease detection program installed in the monitoring system.

As a first method for extending the effective speed region to for example 130 km/h, it is thought to simply re-write the variable of the program to 130 km/h.

However, with this method, the learning and the judgment of the resonance frequency may sometimes be performed in a higher speed region than the conventional example. Thus, an influence of the increased variations of the resonance frequency is strongly exerted, and there is a problem that a pressure decrease detection performance in a speed region of 100 km/h or less is deteriorated.

As a second method for extending the effective speed region to for example 130 km/h, it is thought to divide the speed region in which the monitoring system of the RFM method operates into a region of 100 km/h or less and a region exceeding 100 km/h, and perform the learning and the judgment of the resonance frequency in the respective speed regions independently from each other. With this second method, unlike the first method, the pressure decrease detection performance in the speed region of 100 km/h or less is not deteriorated.

However, with the second method, a memory required for storing a learnt value of the resonance frequency (reference frequency) or the like is increased to a large extent in comparison to the conventional example. Thus, installing this in a built-in computer is not preferable in terms of cost. By dividing the speed region, the judgment in a speed region cannot be performed until the learning of the resonance frequency is completed in the respective speed regions. Thus, it takes more time for starting the judgment.

The present invention has been made in view of the above circumstances, and an objective thereof is to provide a tire pressure decrease detection apparatus, method and computer readable medium therefor capable of, without lowering a pressure decrease detection performance in the conventional speed region, detecting a decrease in pressure in a higher speed region with using the existing calculation resource.

Solution to Problem (1) A tire pressure decrease detection apparatus of the present invention (hereinafter, simply referred to as the "detection apparatus") is an apparatus for detecting a decrease in tire pressure based on a resonance frequency of a tire installed in a vehicle, including
 rotation information detection means for detecting rotation information of the tire,
 resonance frequency estimate means for estimating the resonance frequency of the tire from the rotation information of the tire, and
 judgment means for judging the decrease in the tire pressure by comparison between the resonance frequency estimated by the resonance frequency estimate means and a reference frequency preliminarily determined by learning at the time of initialization,
 wherein an effective speed region when the reference frequency is determined at the time of the initialization is a first speed or less, and
 wherein the apparatus further includes effective speed region change means for extending an upper limit of the effective speed region to a second speed which is larger than the first speed at the time of shifting to judgment of the decrease in the pressure after learning of the reference frequency is completed.

In the detection apparatus of the present invention, by the effective speed region change means, the upper limit of the effective speed region is extended to the second speed which is larger than the first speed at the time of shifting to the judgment of the decrease in the pressure after the learning of the reference frequency is completed. Thus, without lowering the pressure decrease detection performance in the conventional speed region, the decrease in the pressure in a higher speed region can be detected. Further, without increasing a memory, the decrease in the pressure is detected with using the existing calculation resource. Thus, a problem in terms of cost can also be solved.

(2) In the detection apparatus of the above (1), the first speed may be 100 km/h and the second speed may be 130 km/h.

(3) In the detection apparatus of the above (1) or (2), the number of required data of the rotation information of the tire used at the time of estimating the resonance frequency in the effective speed region whose upper limit is extended to the second speed may be set to be more than the number of required data used at the time of estimating the resonance frequency in the effective speed region whose upper limit is the first speed. In this case, the judgment is performed taking a longer time in the higher speed region. Thus, an influence of increased variations of the resonance frequency is reduced, so that the pressure decrease detection performance can be enhanced.

(4) A tire pressure decrease detection method of the present invention (hereinafter, simply referred to as the "detection method") is a method for detecting a decrease in tire pressure based on a resonance frequency of a tire installed in a vehicle, including
 a rotation information detection step for detecting rotation information of the tire,
 a resonance frequency estimate step for estimating the resonance frequency of the tire from the rotation information of the tire, and
 a judgment step for judging the decrease in the tire pressure by comparison between the resonance frequency estimated in the resonance frequency estimate step and a reference frequency preliminarily determined by learning at the time of initialization,
 wherein an effective speed region when the reference frequency is determined at the time of the initialization is a first speed or less, and
 wherein the method further includes an effective speed region change step for extending an upper limit of the effective speed region to a second speed which is larger than the first speed at the time of shifting to judgment of the decrease in the pressure after learning of the reference frequency is completed.

In the detection method of the present invention, in the effective speed region change step, the upper limit of the effective speed region is extended to the second speed which is larger than the first speed at the time of shifting to the judgment of the decrease in the pressure after the learning of the reference frequency is completed. Thus, without lowering the pressure decrease detection performance in the conventional speed region, the decrease in the pressure in the higher speed region can be detected. Further, without increasing the memory, the decrease in the pressure is detected with using the existing calculation resource. Thus, the problem in terms of cost can also be solved.

(5) In the detection method of the above (4), the first speed may be 100 km/h and the second speed may be 130 km/h.

(6) In the detection method of the above (4) or (5), the number of required data of the rotation information of the tire used at the time of estimating the resonance frequency in the effective speed region whose upper limit is extended to the second speed may be set to be more than the number of required data used at the time of estimating the resonance frequency in the effective speed region whose upper limit is the first speed. In this case, the judgment is performed taking a longer time in the higher speed region. Thus, the influence of the increased variations of the resonance frequency is reduced, so that the pressure decrease detection performance can be enhanced.

(7) A non-transitory computer readable medium encoded with a computer program containing instructions stored therein which causes a computer, for detecting a decrease in tire pressure based on a resonance frequency of a tire installed in a vehicle, to function as resonance frequency estimate means for estimating the resonance frequency of the tire from rotation information obtained by rotation information detection means for detecting the rotation information of the tire, and judgment means for judging the decrease in the tire pressure by comparison between the resonance frequency estimated by the resonance frequency estimate means and a reference frequency preliminarily determined by learning at the time of initialization, wherein an effective speed region when the reference frequency is determined at the time of the initialization is a first speed or less, and wherein the program further causes the computer to function as effective speed region change means for extending an upper limit of the effective speed region to a second speed which is larger than the first speed at the time of shifting to judgment of the decrease in the pressure after learning of the reference frequency is completed.

Advantageous Effects of Invention

According to the detection apparatus, method, and computer readable medium of the present invention, without lowering the pressure decrease detection performance in the conventional speed region, the decrease in the pressure in the higher speed region can be detected with using the existing calculation resource.

DESCRIPTION OF EMBODIMENTS

Hereinafter, with reference to the attached drawings, an embodiment of a detection apparatus, method and computer readable medium of the present invention will be described in detail.

Figure 1:
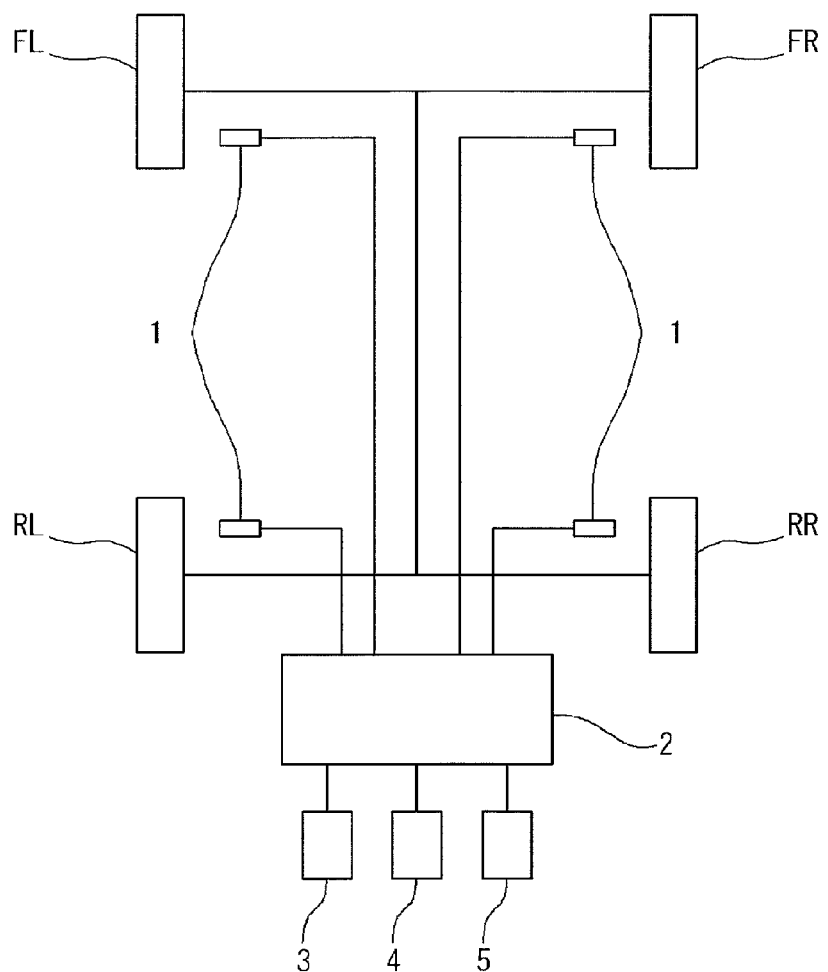
FIG. 1 is a block diagram showing one embodiment of a detection apparatus of the present invention.

As shown in FIG. 1, the detection apparatus according to one embodiment of the present invention is provided with normal wheel speed detection means (rotation information detection means) 1 provided in relation to tires in order to detect rotation speed information (rotation information) of a left front wheel (FL), a right front wheel (FR), a left rear wheel (RL), and a right rear wheel (RR) of four tires provided in a four-wheeled vehicle.

As the wheel speed detection means 1, there can be used a wheel speed sensor for generating a rotation pulse with using an electromagnetic pickup or the like so as to measure rotation angular speed and wheel speed from the number of the pulse, an angular velocity sensor including a sensor for generating electric power with utilizing rotation like a dynamo so as to measure the rotation angular velocity and the wheel speed from voltage thereof, or the like. An output of the wheel speed detection means 1 is given to a control unit 2 serving as a computer such as an ABS. Connected to the control unit 2 are display 3 formed by a liquid crystal display element, a plasma display element, a CRT, or the like for displaying under-inflation of the tires for example, an initialization button 4 capable of being operated by a driver, and an alarm 5 for notifying the driver of the under-inflation of the tire.

Figure 2:
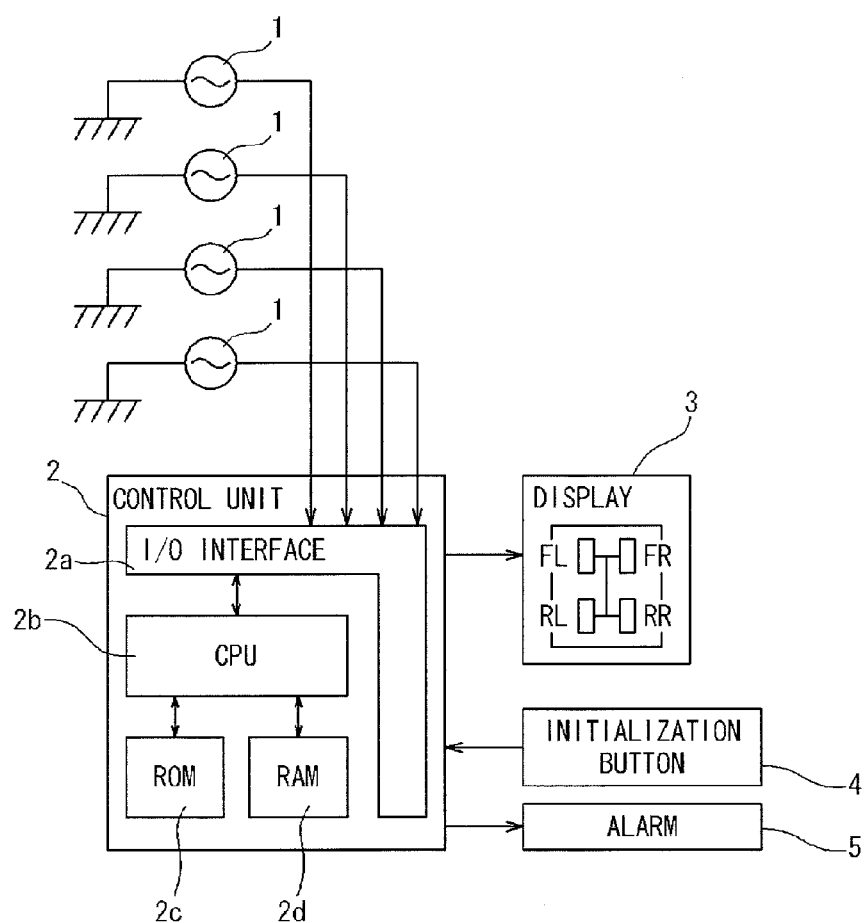
FIG. 2 is a block diagram showing an electric configuration of the detection apparatus shown in FIG. 1.

As shown in FIG. 2, the control unit 2 includes an I/O interface 2$a$ required for sending and receiving signals to and from an external device, a CPU 2$b$ functioning as a center of arithmetic processing, a ROM 2$c$ in which a control operation program of this CPU 2$b$ is stored, and a RAM 2$d$ in which data and the like are temporarily written and the written data is read out when the CPU 2$b$ performs control operation.

In the wheel speed detection means 1, a pulse signal corresponding to the rotation number of the tire (hereinafter, also referred to as the "wheel speed pulse") is outputted. By re-sampling the wheel speed pulse by a predetermined cycle $\Delta T$ (sec) such as $\Delta T$=0.005 seconds, time series data of wheel speed signals can be obtained. Since a resonance frequency in a torsional direction of the focused tire appears in the vicinity of tens of Hz, there is a need for setting a sampling cycle in such a manner that the resonance frequency is included in a Nyquist frequency.

The detection apparatus according to the present embodiment includes the wheel speed detection means (rotation information detection means) 1, resonance frequency estimate means for estimating the resonance frequency of the tire from the rotation information of the tire, and judgment means for judging a decrease in tire pressure by comparison between the resonance frequency estimated by the resonance frequency estimate means and a reference frequency preliminarily determined by learning at the time of initialization. In the present embodiment, an effective speed region when the reference frequency is determined at the time of the initialization is a first speed or less. The detection apparatus further includes effective speed region change means for extending an upper limit of the effective speed region to a second speed which is larger than the first speed at the time of shifting to judgment of the decrease in the pressure after learning of the reference frequency is completed.

The program according to the present embodiment is installed in the control unit 2 and causes the control unit 2 to function as the resonance frequency estimate means, the judgment means, and the effective speed region change means.

The resonance frequency can be estimated by appropriately adopting the known methods such as the method described in Patent Literature 1, and thus is not particularly limited in the present invention. The resonance frequency can be estimated by, for example, performing a time series analysis to rotation acceleration information calculated from the wheel speed which is detected by the wheel speed detection means 1 based on a secondary autoregressive (AR) model. When the obtained resonance frequency exceeds a predetermined threshold value to be less than the reference frequency serving as the resonance frequency calculated at the time of the initialization, it is judged that the tire is deflated and the alarm 5 issues an alarm.

In the present invention, in consideration with the fact that with higher vehicle speed, a high-frequency vibration component becomes stronger, a resonance peak is less easily clearly observed, and accordingly variations of the resonance frequency are increased, the learning of the reference frequency at the time of the initialization is performed in the effective speed region whose upper limit is the first speed. At a time point of completing the learning of the reference frequency and shifting to a judgment step, a variable in the program is re-written by the effective speed region change means, and the upper limit of the effective speed region is changed to the second speed which is larger than the first speed so as to extend the effective speed region. The first speed can be 100 km/h which is the same as the upper limit of the effective operation region of one example in the current monitoring system of the RFM method, for example. The second speed can be 130 km/h for example, in consideration with 80 mph (about 128 km/h) serving as the upper limit value of the legal speed in North America and the like.

With the detection method according to the present embodiment, when learning the reference frequency at the time of the initialization, data at the time of vehicle speed exceeding 100 km/h is rejected. Thus, the same value as the conventional example can be obtained as the reference frequency, and the data at the time of vehicle speed exceeding 100 km/h can also be handled at the time of the judgment after the learning is completed.

Due to the fact that with higher vehicle speed, the high-frequency vibration component becomes stronger, the resonance peak is less easily clearly observed, and as a result, the variations of the resonance frequency are gradually increased. A border line thereof is not necessarily critical but in general, the variations are increased around 100 km/h as a border line. Thus, in the present embodiment, the first speed serving as the upper limit of the effective speed region at the time of the learning is set to 100 km/h.

With the detection method according to the present embodiment, unlike the second method described above, the speed region is not divided. Thus, a single calculation resource can be used at the time of the learning and the judgment of the resonance frequency, so that there is no need for increasing a memory of the control unit 2.

Incidentally, an estimate value of the resonance frequency is not a fixed value but may sometimes show dependency on the vehicle speed according to estimate. Thus, in the present embodiment, by performing correction in accordance with the vehicle speed in such a case, a fixed estimate value of the resonance frequency can be obtained irrespective of the vehicle speed. Specifically, supposing that there is a certain primary correlation between the vehicle speed and the resonance frequency, strength of the correlation (by what Hz the resonance frequency is increased as the vehicle speed is increased by 1 km/h) is statistically determined from measurement data of an actual vehicle, and with using an obtained primary correlation equation, the correction is performed so that the estimate value always becomes the resonance frequency when the vehicle travels at the same speed (such as 75 km/h).

In the judgment of the decrease in the pressure by the RFM method, the predetermined number of observation data is used until deflation is detected. Thus, a fixed time in accordance with the observation data is required until the deflation is detected. Regarding to this, in the present embodiment, in the speed region exceeding 100 km/h serving as the first speed, the number of the required observation data is increased more (for example, about 2 to 500 times more) than the speed region of 100 km/h or less so as to judge the pressure. That is, the judgment is performed taking a longer time in a higher speed region. Thus, an influence of increased variations of the resonance frequency is reduced, so that a pressure decrease detection performance is enhanced.

Further, regarding timing of issuing the alarm of tire deflation, it is thought that when the estimate value of the resonance frequency at the time of traveling becomes smaller than the reference frequency by the predetermined threshold value, the alarm is directly issued. However, in this case, the alarm increasingly frequently gets an early alarm, and there is a possibility that reliability of the system is deteriorated. Thus, in the present embodiment, an alarm judgment value is used. That is, a difference between the resonance frequency at the time of traveling and the reference frequency is compared with a threshold value, and based on a comparison result thereof, the alarm judgment value is counted up or down. In more detail, the resonance frequency estimated at the time of traveling is averaged at every predetermined unit time (such as 1 second), and a difference between the averaged resonance frequency and the reference frequency is compared with the threshold value. Then, when the difference exceeds the threshold value, the alarm judgment value is counted up by one. Meanwhile, the difference is less than the threshold value at the next predetermined unit time, the alarm judgment value is counted down by one. In such a way, when the alarm judgment value reaches a predetermined count number, it is judged that the tire is deflated and the alarm is issued. In this case, in order to shorten an alarm time and improve precision, a plurality of threshold values can be set and count-up/down amounts weighed depending on the threshold values can be used.

Example and Comparative Example

Next, the detection method of the present invention will be described based on an example. The present invention is not limited only to such an example as a matter of course.
<Condition 1>

Normal tires having size of 16 inches were installed in a FWD (Front Wheel Drive) vehicle and the vehicle travelled on a go round circuit of a test course. After tire pressure was adjusted so as to have predetermined vehicle set pressure, the vehicle travelled at about 80 km/h for about 20 minutes, initialization was performed, and a reference frequency was determined.

Next, all four wheels were brought into a 20% deflation state, and the vehicle travelled at about 80 km/h for about 20 minutes in this state.

The above experiment was performed in two ways for a case where the program in the present invention (the first speed is 100 km/h, and the second speed is 130 km/h) is installed in a built-in computer as the example and a case where the conventional program in which the effective speed region is 100 km/h is installed as a comparative example. Results are shown in Table 1.
<Condition 2>

Next, after the tire pressure was returned to the predetermined vehicle set pressure, the vehicle travelled at about 80 km/h for about 20 minutes, and the initialization was performed, all the four wheels were brought into a 30% deflation state, and the vehicle travelled at about 120 km/h for 2 hours in this state.

The above experiment was performed in two ways for the example and the comparative example as well as the condition 1. Results are shown in Table 1.

TABLE 1

|  | Speed upon learning | Speed upon judgment | Detection time (example) | Detection time (comparative example) |
|---|---|---|---|---|
| Condition 1 | 80 km/h | 80 km/h | 17 m 26 s | 17 m 26 s |
| Condition 2 | 80 km/h | 120 km/h | 1 h 48 m 50 s | No alarm |

From Table 1, it is found that the tire deflation can be detected even in a higher speed region of 120 km/h in the example.

REFERENCE SIGNS LIST

1: WHEEL SPEED DETECTION MEANS
2: CONTROL UNIT
2a: INTERFACE
2b: CPU
2c: ROM
2d: RAM
3: DISPLAY
4: INITIALIZATION BUTTON
5: ALARM

What is claimed is:

1. An apparatus for detecting a decrease in tire pressure based on a resonance frequency of a tire installed in a vehicle, comprising:
   rotation information detection means for detecting rotation information of the tire,
   resonance frequency estimate means for estimating the resonance frequency of the tire from the rotation information of the tire, and
   judgment means for judging the decrease in the tire pressure by comparison between the resonance frequency estimated by the resonance frequency estimate means and a reference frequency preliminarily determined by learning at the time of initialization,
   wherein an effective speed region when the reference frequency is determined at the time of the initialization is a first speed and less, the first speed being the upper limit of the effective speed region, and
   wherein the apparatus further comprises effective speed region change means for extending the upper limit of the effective speed region from the first speed to a second speed which is larger than the first speed at the time of shifting to judgment of the decrease in the pressure after learning of the reference frequency is completed.

2. The apparatus according to claim 1, wherein the first speed is 100 km/h and the second speed is 130 km/h.

3. The apparatus according to claim 1, wherein the number of required data of the rotation information of the tire used at the time of estimating the resonance frequency in the effective speed region whose upper limit is extended to the second speed is set to be more than the number of required data used at the time of estimating the resonance frequency in the effective speed region whose upper limit is the first speed.

4. The apparatus according to claim 2, wherein the number of required data of the rotation information of the tire used at the time of estimating the resonance frequency in the effective speed region whose upper limit is extended to the second speed is set to be more than the number of required data used at the time of estimating the resonance frequency in the effective speed region whose upper limit is the first speed.

5. A method for detecting a decrease in tire pressure based on a resonance frequency of a tire installed in a vehicle, including:
   a rotation information detection step for detecting rotation information of the tire,
   a resonance frequency estimate step for estimating the resonance frequency of the tire from the rotation information of the tire, and
   a judgment step for judging the decrease in the tire pressure by comparison between the resonance frequency estimated in the resonance frequency estimate step and a reference frequency preliminarily determined by learning at the time of initialization,
   wherein an effective speed region when the reference frequency is determined at the time of the initialization is a first speed and less, the first speed being the upper limit of the effective speed region, and
   wherein the method further includes an effective speed region change step for extending the upper limit of the effective speed region from the first speed to a second speed which is larger than the first speed at the time of shifting to judgment of the decrease in the pressure after learning of the reference frequency is completed.

6. The method according to claim 5, wherein the first speed is 100 km/h and the second speed is 130 km/h.

7. The method according to claim 5, wherein the number of required data of the rotation information of the tire used at the time of estimating the resonance frequency in the effective speed region whose upper limit is extended to the second speed is set to be more than the number of required data used at the time of estimating the resonance frequency in the effective speed region whose upper limit is the first speed.

8. The method according to claim 6, wherein the number of required data of the rotation information of the tire used at the time of estimating the resonance frequency in the effective speed region whose upper limit is extended to the second speed is set to be more than the number of required data used at the time of estimating the resonance frequency in the effective speed region whose upper limit is the first speed.

9. A non-transitory computer readable medium encoded with a computer program containing instructions stored therein which causes a computer, for detecting a decrease in tire pressure based on a resonance frequency of a tire installed in a vehicle, to function as
   resonance frequency estimate means for estimating the resonance frequency of the tire from rotation information obtained by rotation information detection means for detecting the rotation information of the tire, and
   judgment means for judging the decrease in the tire pressure by comparison between the resonance frequency estimated by the resonance frequency estimate means and a reference frequency preliminarily determined by learning at the time of initialization,
   wherein an effective speed region when the reference frequency is determined at the time of the initialization is a first speed and less, the first speed being the upper limit of the effective speed region, and
   wherein the program further causes the computer to function as effective speed region change means for extending the upper limit of the effective speed region from the first speed to a second speed which is larger than the first speed at the time of shifting to judgment of the decrease in the pressure after learning of the reference frequency is completed.

* * * * *